United States Patent
Feng

(10) Patent No.: US 9,264,455 B2
(45) Date of Patent: Feb. 16, 2016

(54) CLUSTERING CALL SERVERS TO PROVIDE PROTECTION AGAINST CALL SERVER FAILURE

(75) Inventor: Shiang Yueng Feng, Colleyville, TX (US)

(73) Assignee: Alcatel Lucent, Boulogne-Billancourt (FR)

(*) Notice: Subject to any disclaimer, the term of this patent is extended or adjusted under 35 U.S.C. 154(b) by 2328 days.

(21) Appl. No.: 11/274,956

(22) Filed: Nov. 15, 2005

(65) Prior Publication Data

US 2007/0109960 A1 May 17, 2007

(51) Int. Cl.
*H04L 29/06* (2006.01)
*H04L 29/14* (2006.01)

(52) U.S. Cl.
CPC ........ *H04L 65/104* (2013.01); *H04L 29/06027* (2013.01); *H04L 65/103* (2013.01); *H04L 69/40* (2013.01); *H04Q 2213/13034* (2013.01); *H04Q 2213/13196* (2013.01); *H04Q 2213/13389* (2013.01)

(58) Field of Classification Search
CPC ..... H04L 65/104; H04L 69/40; H04L 65/103; H04L 29/06027; H04Q 2213/13034; H04Q 2213/13196; H04Q 2213/13389
USPC .......................................... 370/219, 216, 217
See application file for complete search history.

(56) References Cited

U.S. PATENT DOCUMENTS

| | | | | |
|---|---|---|---|---|
| 5,361,396 A | * | 11/1994 | Onoe et al. | 455/435.1 |
| 7,085,260 B2 | * | 8/2006 | Karaul et al. | 370/352 |
| 7,227,927 B1 | * | 6/2007 | Benedyk et al. | 379/9.05 |
| 7,286,545 B1 | * | 10/2007 | Tester et al. | 370/401 |
| 7,532,568 B1 | * | 5/2009 | Boudreaux et al. | 370/217 |
| 2002/0027983 A1 | | 3/2002 | Suzuki | |
| 2004/0114748 A1 | | 6/2004 | Copley | |
| 2007/0165516 A1 | * | 7/2007 | Xu et al. | 370/217 |

FOREIGN PATENT DOCUMENTS

DE 10314542 A1 10/2004
JP 2003078567 3/2003
WO WO 2005/081447 A1 9/2005

OTHER PUBLICATIONS

EPO Search Report for EP Patent Application No. 06 02 2468 dated Feb. 28, 2007.

* cited by examiner

*Primary Examiner* — Mohammad Anwar
(74) *Attorney, Agent, or Firm* — Capitol Patent & Trademark Law Firm, PLLC

(57) ABSTRACT

Systems and techniques for providing call server failure protection involve assigning a set of media gateways to each of three or more call servers. Each call server has primary control of the corresponding assigned set of media gateways. A second call server is designated as having secondary control of a first media gateway assigned to a first of the call servers. A third call server is designated as having secondary control of a second media gateway assigned to the first call server. Secondary control is activated in response to a failure of the first call server.

7 Claims, 6 Drawing Sheets

CLUSTERING CALL SERVERS TO PROVIDE PROTECTION AGAINST CALL SERVER FAILURE

TECHNICAL FIELD

This description relates to telecommunication networks, and more particularly to clustering call servers to provide protection against call server failure.

BACKGROUND

Conventional cellular telecommunications networks include mobile switching centers (MSCs) each operating to route calls between base stations that include radio equipment for serving one or more cells in the cellular network and other MSCs or public switched telephone networks (PSTNs). Conventional MSCs handle both bearer traffic for transporting user information (e.g., voice or other data in an integrated service, digital network (ISDN)) and signaling traffic for establishing and controlling call connections and managing the cellular network. The MSC exchanges signaling information with other MSCs and with other networks (e.g., PSTNs) for purposes of call set up, handovers, and coordinating call routing. In addition, the MSC directs the operations of base stations that support radio communications with mobile devices in individual cells of the cellular network.

Distributed MSCs (e.g., as can be used with 3GPP, Release 4) perform the same general functions as a conventional MSC but include an MSC server for handling signaling traffic and multiple media gateways for handling bearer traffic. The MSC server includes the intelligence and complexity of the distributed MSC, and the media gateways are controlled by the MSC server. The media gateways can be geographically distributed, can connect to multiple base stations, and serve to route bearer traffic under control of the MSC server.

SUMMARY

In one general aspect, call server failure protection is provided by assigning a set of media gateways to each of three or more call servers. Each call server has primary control of the corresponding assigned set of media gateways. The set of media gateways includes a first media gateway and a second media gateway, and the call servers include a first call server, a second call server, and a third call server. The second call server is designated as having secondary control of the first media gateway, which is assigned to a first of the call servers. The third call server is designated as having secondary control of the second media gateway, which is assigned to the first call server. Secondary control is activated in response to a failure of the first call server.

Implementations can include one or more of the following features. Secondary control remains dormant when primary control is active, and failure of the first call server results in deactivating primary control. Messages are exchanged between the three or more call servers to monitor for call server failures. Messages are also or alternatively exchanged between each call server and media gateways in the corresponding assigned set of media gateways to monitor for call server failures. A primary point code is assigned to each call server. The primary point code is used to indicate a location of a mobile station served by the call server in a home location register associated with the mobile station. One or more secondary point codes are assigned to each call server, and the first call server and the second call server share a secondary point code with respect to the first media gateway for use by a base station controller associated with the first media gateway. The first media gateway routes messages from the associated base station controller addressed to the shared secondary point code to the first call server when primary control is active and to the second call server when secondary control is active. Alternatively or in addition, the first call server and the second call server share a secondary point code with respect to the first media gateway for use by a tandem mobile switching center.

In some implementations, there are multiple call server clusters. Each call server cluster includes three or more call servers, and each call server has primary control of a corresponding set of media gateways. Upon detecting a failed call server in a particular call server cluster, control of the media gateways in the set of media gateways corresponding to the failed call server is divided among at least two other call servers in the particular call server cluster. Each call server can be associated with a plurality of call server clusters, and each call server cluster can include a different set of call servers. The call servers process and route control messaging, and the media gateways establish communication trunks under control of a call server. A command can be sent to deactivate primary control of the first media gateway and/or the second media gateway.

A call server can route traffic addressed to a destination point code through a third media gateway under primary control of the second call server if secondary control of the first media gateway is deactivated and through the first media gateway if secondary control of the first media gateway is activated. Secondary control of media gateways can be meshed. Signaling and traffic through the first media gateway is disabled in response to an instruction to deactivate primary control of the first media gateway, and signaling and traffic through the first media gateway is enabled after activating secondary control of the second media gateway.

Unique primary point codes are associated with each of the first call server and the second call server. The primary point codes are used in call processing. A shared secondary point code is associated with the first call server and the second call server. The shared secondary point code is used by nodes that communicate through the first media gateway with the first call server or the second call server depending on whether primary control or secondary control is activated for the first media gateway. The first call server broadcasts a message indicating that the shared secondary point code is unreachable through the first call server in response to receiving an instruction to relinquish control of the first media gateway.

The details of one or more implementations are set forth in the accompanying drawings and the description below. Other features will be apparent from the description and drawings, and from the claims.

DETAILED DESCRIPTION

Figure 1:
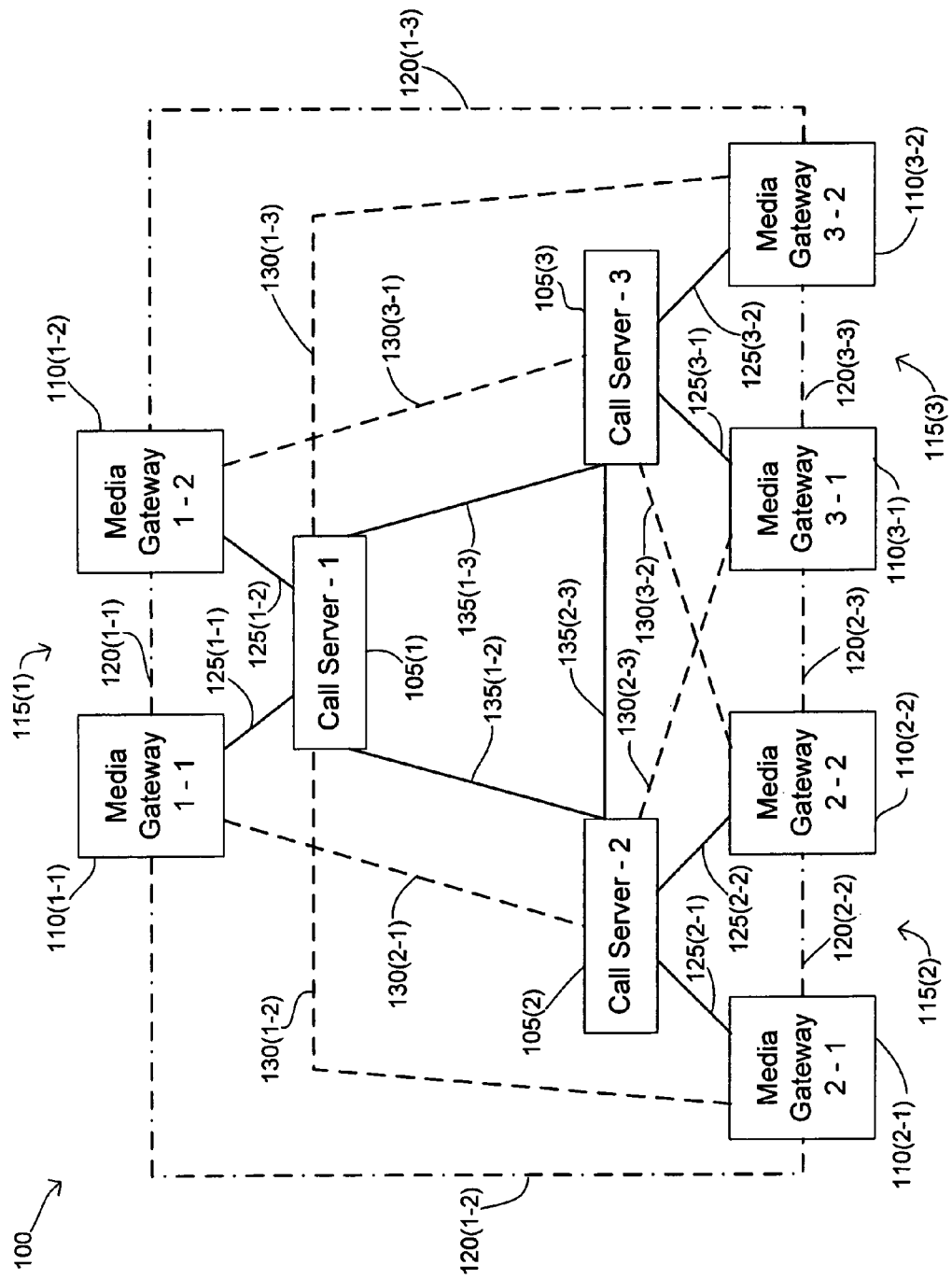
FIG. 1 is a block diagram of a distributed MSC cluster.

FIG. 1 is a block diagram of a distributed mobile switching center (MSC) cluster 100. The distributed MSC cluster 100 includes multiple call servers 105(1), 105(2), and 105(3). Additionally, the distributed MSC cluster 100 includes multiple media gateways 110(1-1), 110(1-2), 110(2-1), 110(2-2), 110(3-1) and 110(3-2) internal to the distributed MSC cluster 100. Each of the media gateways 110(1-1), 110(1-2), 110(2-1), 110(2-2), 110(3-1) and 110(3-2) may be connected to one or more of the call servers 105. Control over the media gateways 110 may be divided between the call servers 105. The combination of one of the call servers 105 and one or more of the media gateways 110 that the call server 105 controls may be referred to as a distributed MSC 115 or softswitch. The call server 105(1) and media gateways 110(1-1, 1-2) make up distributed MSC1 115(1). The call server 105(2) and media gateways 110(2-1, 2-2) make up distributed MSC2 115(2). The call server 105(3) and media gateways 110(3-1, 3-2) make up distributed MSC3 115(3).

The call servers 105 contain the intelligence and the primary processing resources for the distributed MSC cluster 100. Accordingly, the call servers 105 exchange control signaling data with one another. Additionally, the call servers 105 send and receive the signaling data to and from external switches (not shown) that may include, for example, a BSC, a switch in a public switched telephone network (PSTN), a conventional MSC, another distributed MSC or soft switch, or a gateway MSC. Further, the call servers 105 control the switching activities of the media gateways 110. For example, the call setup messaging is handled by the call servers 105 that instruct the media gateways 110 to route calls using particular circuits. Thus, the call servers 105 include connections 125 with each of the media gateways 110 for sending control data and connections (not shown) with the external switches also for communicating control signaling data. The media gateways 110 route data and voice traffic over trunk connections 120, including trunk connections with external switches, under the control off the call servers 105.

The voice trunks or trunk connections 120 may be used to carry voice and data traffic between the media gateways 110, and between the media gateways 110 and the external switches. In the illustrated example of FIG. 1, two types of trunk connections are shown, Inter Machine Trunks (IMTs) 120(1-2), 120(1-3), and 120(2-3) and Inter Connection Trunks (ICTs) 120(1-1), 120(2-2), 120(3-3). The IMTs 120(1-2), 120(1-3), and 120(2-3) and the ICTs 120(1-1), 120(2-2), and 120(3-3) are generally the same physically but are logically distinguishable. If two media gateways 110 are connected with an ICT 120(1-1), 120(2-2), and 120(3-3), then data and voice traffic is routed through the media gateways 110 under the control of same call server 105. If two media gateways 110 are connected with an IMT 120(1-2), 120(1-3), and 120(2-3), then data and voice traffic is routed by the call server 105 of the first media gateway 110 coordinating with the other call server 105 that controls the second media gateway 110 on the other end of the IMT 120(1-2), 120(1-3), and 120(2-3). Each media gateway 110 may have one or more trunk connections 120 with one or more external switches.

Control of each of the media gateways 110(1-1), 110(1-2), 110(2-1), 110(2-2), 110(3-1) and 110(3-2) by the call servers 105 may be divided between the call servers 105. However, each of the media gateways 110 typically has only one call server 105 that has primary control at any given time. Thus each of the call servers 105(1), 105(2), and 105(3) has primary control of a corresponding set of the media gateways 110(1-1, 1-2), 110(2-1, 2-2), and 110(3-1, 3-2). Primary control involves receiving and sending messages for setting up and controlling voice trunks 120 to and from the media gateways 110. Such messages are sent by the call servers 105 over a primary control link 125 to each of the media gateways 110 over which the call server 105 has primary control. In the illustrated example of FIG. 1, the call server 105(1) has primary control over media gateways 110(1-1) and 110(1-2), the call server 105(2) has primary control over media gateways 110(2-1) and 110(2-2), and the call server 105(3) has primary control over media gateways 110(3-1) and 110(3-2).

Additionally, each call server 105 within the distributed MSC cluster 100 is designated as having secondary control of one of the media gateways 110 previously assigned to each of the other primary call servers 105(1), 105(2), and/or 105(3). Thus, secondary control of the media gateways 110 assigned to a primary call server 105 is divided between the remaining call servers 105 within the distributed MSC cluster 100. Upon a failure of one of the call servers 105(1), 105(2), or 105(3), control of the media gateways 110 in the corresponding set of media gateways 110(1-1, 1-2), 110(2-1, 2-2), and 110(3-1, 3-2) is divided among at least two other call servers 105 in FIG. 1. A failure may include a loss of power, a loss of a communication link to the call server 105, a software failure, a forced disablement such as taking the call server 105 offline for maintenance, or another type of failure. In the illustrated example of FIG. 1, the call server 105(1) has secondary control over media gateways 110(2-1) and 110(3-2), the call server 105(2) has secondary control over media gateways 110(1-1) and 110(3-1), and the call server 105(3) has secondary control over media gateways 110(1-2) and 110(2-2). The call servers 105 are connected by a secondary control link 130 to each of the media gateways 110 over which the call server 105 may assume control in the event of a failure.

The call servers 105 and its assigned set of media gateways 105 exchange messages over the primary control links 125 to monitor for the failure of the other call servers 105. The secondary control of the media gateways 110 by the call servers 105 remains dormant when the primary control of the media gateways 110 by the call servers 105 is active. A failure of the primary control of the media gateways 110 results in the deactivation of the primary control. The secondary control of the media gateways 110 by the call servers 105 may be activated in response to a failure of the primary control of the media gateways 110 due to, for example, the failure of a call server 105 or the failure of a primary control link 125. Upon detecting a failed call server 105 (or a failed primary control link 125) in a particular distributed MSC cluster 100, control of the individual media gateways 110(1-1) and 110(1-2), 110(2-1) and 110(2-2), and 110(3-1) and 110(3-2) under primary control of the failed call server 105(1), 105(2), and 105(3) is divided among at least two of the other call servers 105(2,3), 105(1,3), or 105(1,2). In the illustrated example of FIG. 1, in the event that call server 105(1) fails, the control of the media gateways 110(1-1) and 110(1-2) is divided among the call servers 105(2) and 105(3). The call server 105(2) assumes secondary control, via secondary control link 130(2-3), of the media gateway 110(1-1), and the call server 105(3) assumes secondary control, via secondary control link 130(3-1), of the media gateway 110(1-2).

The exchange of control signaling data between the call servers 105 occurs via the control links 135(1-2,2-3,1-3). The call servers 105 exchange messages and monitor for failures by other call servers 105. In response to such a failure, a backup or secondary call server 105 may assume control of the media gateways 110 previously controlled by the failed call server 105 (described in more detail in FIGS. 5 and 6). The messages exchanged by the call servers 105 may include "keep alive messages," periodic query and response messaging, relinquish media gateway control messages, and status information messages regarding the control state or other state data of a call server 105. The "keep-alive" messages are messages exchanged by the call servers 105 in a distributed MSC cluster 100 to monitor whether the other call servers 105 in the distributed MSC cluster 100 are still operational. The "keep-alive" messages may be messages that are periodic, automatic notifications, or the messages may be query-response type messages. State data for each of the call server's 105 primary and secondary media gateways 110 is stored in the call server 105 itself. A ClusterControlState parameter indicates whether the control of the media gateway 110 is active or is in standby mode. A ClusterAdminState parameter indicates whether the media gateway 110 is "locked" or "unlocked" (with respect to the querying call server 105). The terminology "locked" and "unlocked" is used in the administrative context to define whether a media gateway 110, and subsequently, the resources provided by the media gateway 110 (i.e., control links 125), is disabled or not allowed to be used (i.e., locked) or is enabled or allowed to be used (i.e., unlocked). When a media gateway 105 is in a standby state the media gateway 105 may not be unlocked. When a media gateway 105 is in an active state the media gateway 105 may be locked or unlocked. In some cases, the "keep-alive" messages may be used to exchange state data between the call servers 105.

Further, data signaling messages exist to support control redundancy between the call servers 105 in the distributed MSC cluster 100. These messages may include ControlState, RelinquishControl, ControlRelinquished, setStandby, masterLinkStatusquery, masterLinkStatus, setMaster, masterLinkDown, masterLinkDownClear, ForwardRelinquishControl, or other messages. The ControlState message can be sent by one call server (e.g., 105(1)) to another call server (e.g., 105(2)) to indicate to the neighboring call server 105(2) the state (e.g., active or standby) of the call server 105(1) that issued the message. The RelinquishControl message can be issued by one call server (e.g., 105(1)) to another call server (e.g., 105(2)) instructing the latter call server 105(2) to relinquish control of a media gateway (e.g., 110(2-1)) for call load balancing, maintenance, or other purposes. The ControlRelinquished message is issued by the latter call server 105(2), in response to the Relinquish Control message, to acknowledge receipt of the RelinquishControl message. The set Standby message can be issued to a media gateway (e.g., 110(1-1)) by its master call server (e.g., 105(1)) to indicate to the media gateway 110(1-1) what call server will act as its secondary call server (e.g., 105(2)). The masterLinkStatusquery message can be issued by a call server (e.g., 105(1)) to a media gateway (e.g., 110(2-1)) to query as to whether the link between the current master call server (e.g., 105(2)) and the media gateway 110(2-1) is up or down. The masterLinkStatus message is issued by the media gateway 110(2-1), in response to the masterLinkStatusquery message, to indicate to the call server 105(1) whether the link to its master call server 105(2) is up or down. The setMaster message is sent by a call server (e.g., 105(1)) to a media gateway (e.g., 110(2-1)) to indicate to the media gateway 110(2-1) that the call server 105(1) is to serve as the master to the media gateway 110(2-1). The masterLinkDown message is issued by a media gateway (e.g., 110(2-1)) to indicate to a secondary call server (e.g., 105(1)) that the link to the master call server (e.g., 105(2)) for the media gateway 110(2-1) is down. The master-LinkDownClear message is issued by a media gateway (e.g., 110(2-1)) to indicate to a secondary call server (e.g., 105(1)) that the link to the master call server (e.g., 105(2)) for the media gateway 110(2-1) is back up. The ForwardRelinquish-Control message is issued by a secondary call server (e.g., 105(1)) to a master call server (e.g., 105(2)) via a media gateway (e.g., 110(2-1)) to indicate to the master call server 105(2) that control of the media gateway (110(2-1)) is to be relinquished. The ForwardRelinquishControl message can be issued in the event that the link between the secondary call server 105(1) and the master call server 105(2) is down.

To the external switches, each distributed MSC 115 generally has the characteristics of a conventional switch. In other words, the logical and geographic separation of the call servers 105 from the media gateways 110, including the division of functions between them, within each distributed MSC 115 is generally immaterial to the external switches. Thus, each distributed MSC 115 operates as a single switch from the point of view of the external switches.

Figure 2:
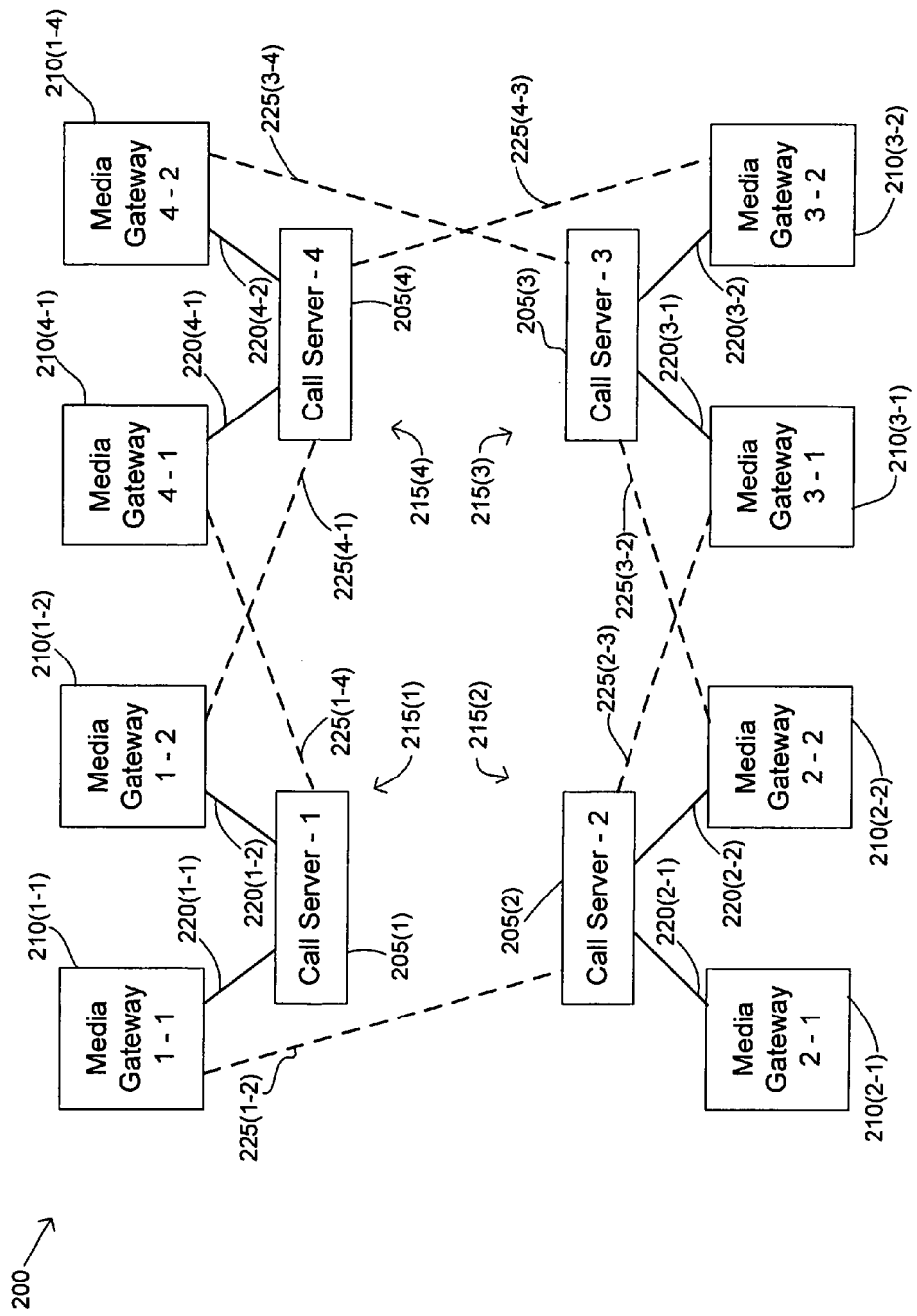
FIG. 2 is a block diagram of a meshed DMSC cluster.

FIG. 2 is a block diagram of a meshed distributed MSC cluster 200. Similar to FIG. 1, the meshed distributed MSC cluster 200 includes multiple (for example, four) call servers 205(1), 205(2), 205(3) and 205(4). Additionally, the meshed distributed MSC cluster 200 includes a plurality of media gateways 210(1-1), 210(1-2), 210(2-1), 210(2-2), 210(3-1), 210(3-2), 210(4-1) and 210(4-2) internal to the meshed distributed MSC cluster 200. Each of the media gateways 210 may be connected to one or more of the call servers 205. Additionally, each of the media gateways 210 may be divided between the call servers 205 so that each of the media gateways 210 has only one call server 205 having primary control. The combination of one of the call servers 205 and one or more of the media gateways 210 that the call server 205 controls may be referred to as a distributed MSC 215 or softswitch. The call server 205(1) and the media gateways 210(1-1, 1-2) make up distributed MSC1 215(1). The call server 205(2) and the media gateways 210(2-1, 2-2) make up distributed MSC2 215(2). The call server 205(3) and the media gateways 210(3-1, 3-2) make up distributed MSC3 215(3). The call server 205(4) and the media gateways 210(4-1, 4-2) make up distributed MSC4 215(4). Further, the combination of two or more of the distributed MSCs 215 may be referred to as a distributed MSC cluster (not explicitly shown in FIG. 2).

Unlike FIG. 1, the media gateways 210 in FIG. 2 are divided between the call servers 205 such that each of the call servers 205 belongs to multiple distributed MSC clusters. In the illustrated implementation, each of the distributed MSC clusters includes three call servers 205, with each of the call servers 205 having primary control of a corresponding set of the media gateways 210. Upon detecting a failed call server 205 in a particular distributed MSC cluster, the control of the media gateways 210 in the set of media gateways 210 corresponding to the failed call server 205 is divided among the two other call servers 205 in the particular distributed MSC cluster. Stated another way, each of the distributed MSC clusters includes three distributed MSCs 215. In some implementations, the distributed MSC clusters may include a different number of call servers 205, such as two, four, or some other number. Additionally, each of the call servers 205 may be associated with a plurality of distributed MSC clusters with each of the distributed MSC clusters comprising a different set of call servers 205. The association of a call server 205 with multiple distributed MSC clusters may be referred to as cluster meshing.

In the illustrated example of the meshed distributed MSC clusters 200 shown in FIG. 2, each of the call servers 205 is associated with three of the distributed MSC clusters and each of the distributed MSC clusters comprises a different set of call servers 205. However, each of the call servers 205 does not serve as an alternate (standby or secondary call server 205) for every other call server 205 as in the illustrated example of FIG. 1. The meshed distributed MSC clusters 200 include four distinct distributed MSC clusters. The association of distributed MSCs 215(4), 215(1), and 215(2) forms the distributed MSC cluster1. The association of distributed MSCs 215(1), 215(2), and 215(3) forms the distributed MSC cluster2. The association of distributed MSCs 215(2), 215(3), and 215(4) forms the distributed MSC cluster3. The association of distributed MSCs 215(3), 215(4), and 215(1) forms the distributed MSC cluster4.

Each of the unique distributed MSC clusters includes a first call server 205 (e.g., 205(1)) that may have primary control over a first set of media gateways 210 (e.g., 210(1-1) and 210(1-2)). The first set of media gateways 210 may include a first media gateway 210 and a second media gateway 210. The secondary control of the first media gateway 210 may be associated with a second one of the call servers 205 (e.g., 205(2)). The secondary control of the first media gateway 210 may be activated in response to the deactivation of the primary control of the first media gateway 210. The secondary control of the second media gateway 210 may be associated with a third one of the call servers 205 (e.g., 205(4)). The secondary control of the second media gateway 210 may be activated in response to the deactivation of the primary control of the second media gateway 210.

Figure 3:
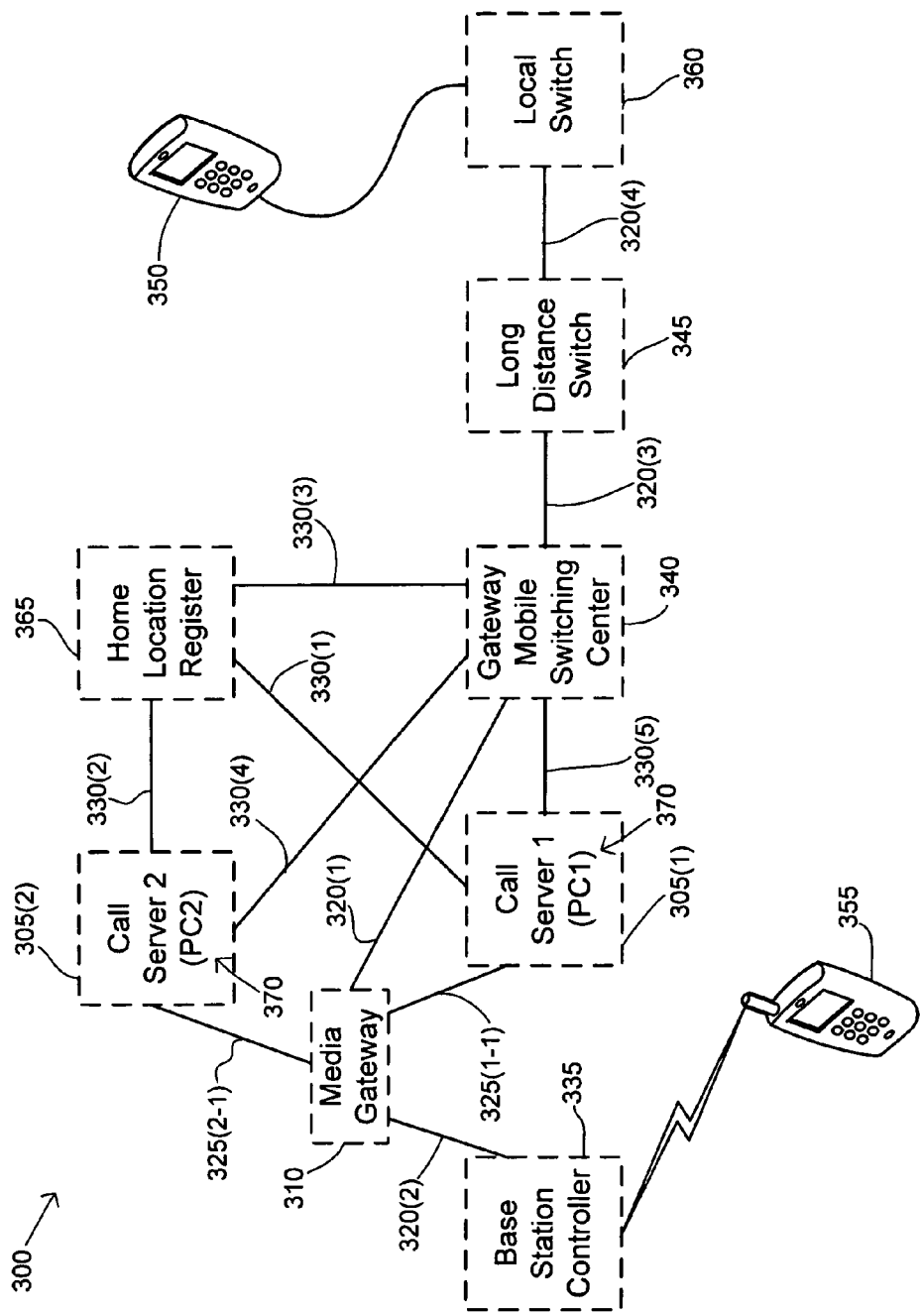
FIG. 3 is a block diagram of a telecommunications network.

FIG. 3 is a block diagram of a telecommunications network 300 that includes a media gateway 310 that may be controlled by a primary call server 305(1) or a secondary call server 305(2). The media gateway 310 may be connected by interconnections 320(1) and 320(2) through which voice and data traffic may be routed between a base station controller 335 and a gateway mobile switching center (gateway MSC) 340. The call servers 305 contain the intelligence and the complexity for controlling call setup and call and data routing, and the media gateway 310 may be controlled by either of the call servers 305 to perform switching functions. Accordingly, communications involving the media gateway 310 are segregated between signaling traffic, which may be handled by the call servers 305 via signal lines 330, and voice and data traffic that may be handled by the media gateway 310 on trunk lines 320.

The media gateway 310 may be associated with a number of base station controllers 335 that each serve different geographical areas. For convenience, only one base station controller 335 and media gateway 310 is illustrated in FIG. 3. The media gateway 310 may interface with a gateway mobile switching center 340. The gateway MSC 340 further interfaces with a long distance switch 345. In some implementations, the long distance switch 345 may also or alternatively interface directly with one or more media gateways 310.

When a call is placed from a telephone 350 in, for example, a fixed network to a mobile station 355 (e.g., a cell phone) in a cellular network, the call is routed on trunk line 320(4) from a local switch 360 to the long distance switch 345. The long distance switch 345 routes the call on the trunk line 320(3) to the gateway MSC 340. The gateway MSC 340 may be a conventional MSC or a distributed MSC. In some cases, a long distance switch 345 may perform some or all of the same functions described as being performed by the gateway MSC 340. The gateway MSC 340 sends signaling data (e.g., a send routing information (SRI) message) in, for example, a GSM MAP message to a home location register (HLR) 365 (e.g., to determine whether the mobile station 355 is currently located in the cellular network, is located in a different cellular network, or is unavailable), which is periodically updated through registration messages received from the mobile station 355. The HLR 365 stores a primary point code 370 assigned to each call server 305 and uses the primary point code 370 to indicate a location of the call server 305 currently serving the mobile station 355. When the HLR 365 receives the SRI message, it responds to the gateway MSC 340 with the point code 370 for the serving call server 305 that is indicated in the HLR 365 data stored for that mobile station 355.

The gateway MSC 340 sends signaling data to the serving callserver 305 using the point code 370. The call server 305 determines that the mobile station 355 is located in an area served by the particular base station controller 335, which is associated with a MSC 305(1) of the distributed MSC. Accordingly, the call server 305, in cooperation with the gateway MSC 340, sets up trunk connections 320(1) and 320(2) via the media gateway 310 to the serving base station controller 335 for routing the call to the mobile station 355. In the event that the primary call server 305(1) and/or its control link 325(1-1) goes down, the control of the media gateway 310 may be switched to the secondary call server 305(2), which controls the media gateway 310 through control link 325(2-1). In this instance, a notification is sent by at least one of the call servers 305 to the HLR to update the point code 370 associated with the call server 305 currently controlling the media gateway 310. Thereafter, the HLR 365 will provide the point code 370 for the secondary call server 305(2) in response to the SRI messages from the gateway MSC 340, and the gateway MSC 340 will communicate with the secondary call server 305(2) to setup trunk connections 320(1) and 320(2) for routing the call.

Although the foregoing example illustrates a situation in which a call is placed from a fixed telephone 350 to a mobile station 355 in a network, the described techniques may be used in situations other than that illustrated by the example. For instance, the techniques are not limited to calls placed from a fixed telephone 350 but can be used for calls from another mobile station.

Figure 4:
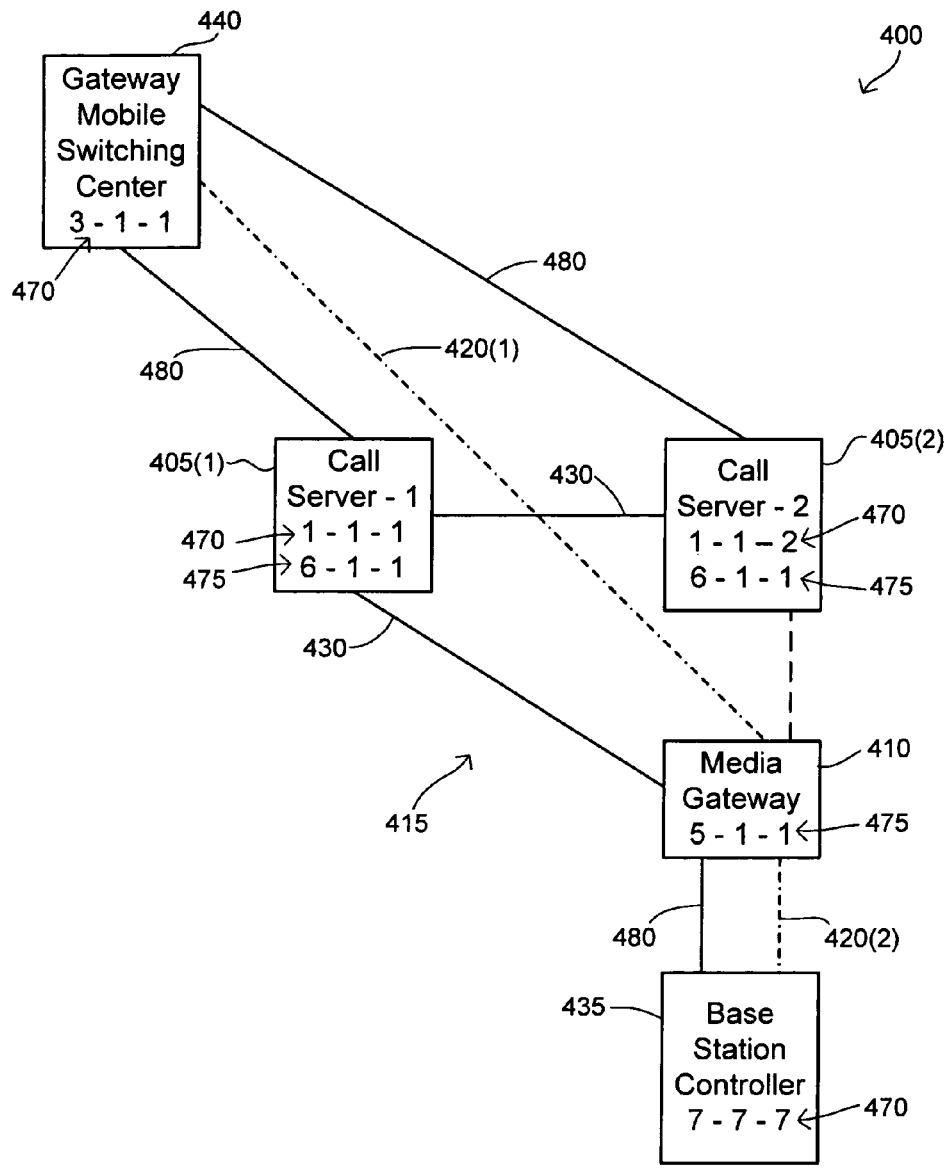
FIG. 4 is a block diagram of a telecommunications network.

FIG. 4 is a block diagram of a telecommunications network 400 that includes a distributed MSC architecture 415. The distributed MSC architecture 415 includes multiple call servers 405 that are capable of controlling a media gateway 410. Typically, multiple media gateways 410 are geographically distributed such that each media gateway 410 may be associated with a number of base station controllers 435 that serve different geographical areas. One or more of the media gateways 410 may interface with a gateway MSC 440 or some other switching node, such as an anchor MSC.

When a call is placed from a telephone (such as 350 in FIG. 3) in a remote network to a mobile station (such as 355 in FIG. 3) in a telecommunications network 400, the gateway MSC 440 sends signaling data to the serving call server 405(1) in, for example, an ISDN user part (ISUP) message to facilitate routing the call through an originating trunk 420(1) to the serving media gateway 410 in the cellular network. The call server 405(1) sends signaling data via the media gateway 410 to the base station controller 435 serving an area in which the mobile station 355 is located for establishing a radio connection with the mobile station 355. In addition, the call server 405(1) directs the media gateway 410 connected to the originating trunk 420(1) to route the call through a trunk connection 420(2) to the base station controller 435.

Point codes serve as an addressing scheme within the telecommunications network 400 so that various nodes know where to route signaling messages, voice calls, data traffic, and any other information. Each node within the telecommunications network 400 typically has a primary point code which serves as a relatively widely recognized address for the node. In some cases, a node can have a secondary point code, which serves as an alternative, logical address for the node.

In the illustrated example of the telecommunications network 400 of FIG. 4, the gateway MSC 440 can be a tandem MSC (e.g., an MSC owned by a different company) or other MSC that will route calls to the distributed MSC architecture 415 through the media gateway 410. Because control of the media gateway 410 can switch between a primary call server 405(1) and a secondary call server 405(2), the gateway MSC 440 needs to be notified as to which call server 405(1) or 405(2) to communicate with to setup the trunk connections 420(1). In this example (e.g., where the gateway MSC 440 is under the control of a different network operator), the gateway MSC 440 may not be expected to update point codes 470 identifying the call server 405 that is currently controlling the media gateway 410 when control over the media gateway 410 changes from one call server 405(1) to the other call server 405(2). Therefore, a secondary point code 475 may be logically associated with both call servers 405 for use in exchanging signaling messages for setting up calls that are routed through the media gateway 410.

For the gateway MSC 440 to set up trunk connection 420(1) with media gateway 410, the gateway MSC 440 needs to communicate signaling information through a signaling link 480 with the call server 405 that currently controls the media gateway 410. The gateway MSC 440 is instructed that the point code (PC) for such signaling information is 5-1-1 (a secondary point code 475). Active call server 405(1) broadcasts that PC 5-1-1 475 is reachable through itself (e.g., using PC 1-1-1 470), and active call server 405(2) broadcasts that PC 5-1-1 475 is unreachable through itself (e.g., PC 1-1-2 470). Subsequently, if control over media gateway 410 switches, and call server 405(2) becomes active, the new call server 405(2) broadcasts that PC 5-1-1 475 is reachable through itself (e.g., through PC 1-1-2 470).

The deactivated call server 405(1) may or may not broadcast that PC 5-1-1 475 is unreachable through itself (e.g., if the deactivated call server 405(1) is out of service). The gateway MSC 440 will set up calls that need to be routed through the trunk connection 420(1) by sending signaling messages to PC 5-1-1 475 through the appropriate "intermediate" node 405(1) or 405(2) based on the received information regarding whether PC 5-1-1 475 is reachable through PC 1-1-1 470 or through PC 1-1-2 470. As a result, the active call server 405(1) or 405(2) will receive signaling messages from the gateway MSC 440 for setting up trunk connections 420(1) between the gateway MSC 440 and the media gateway 410.

Base station controller 435 also needs to be able to communicate signaling information with the call server 405 currently controlling the media gateway 410 through a control link 430 and a signaling link 480. Accordingly, a secondary point code 475 (e.g., 6-1-1) is assigned to each of the call servers 405 that may control the media gateway 410. Base station controller 435 addresses messages to the controlling call server 405 using this secondary point code 475. The media gateway 410 operates to route messages sent by the base station controller 435 and addressed to the secondary point code 475 to the call server 405 that is currently actively controlling the media gateway 410.

Thus, the first call server 405(1) and the second call server 405(2) share a secondary point code 475 (e.g., point code 6-1-1) for use by a base station controller 435 associated with the first media gateway 410. In the examples of FIGS. 1 and 2, this may be extended such that a first call server 105(1) and a third call server 105(3) may share a secondary point code 475 with respect to a second media gateway 110(1-2) for use by a second base station controller associated with the second media gateway.

Figure 5:
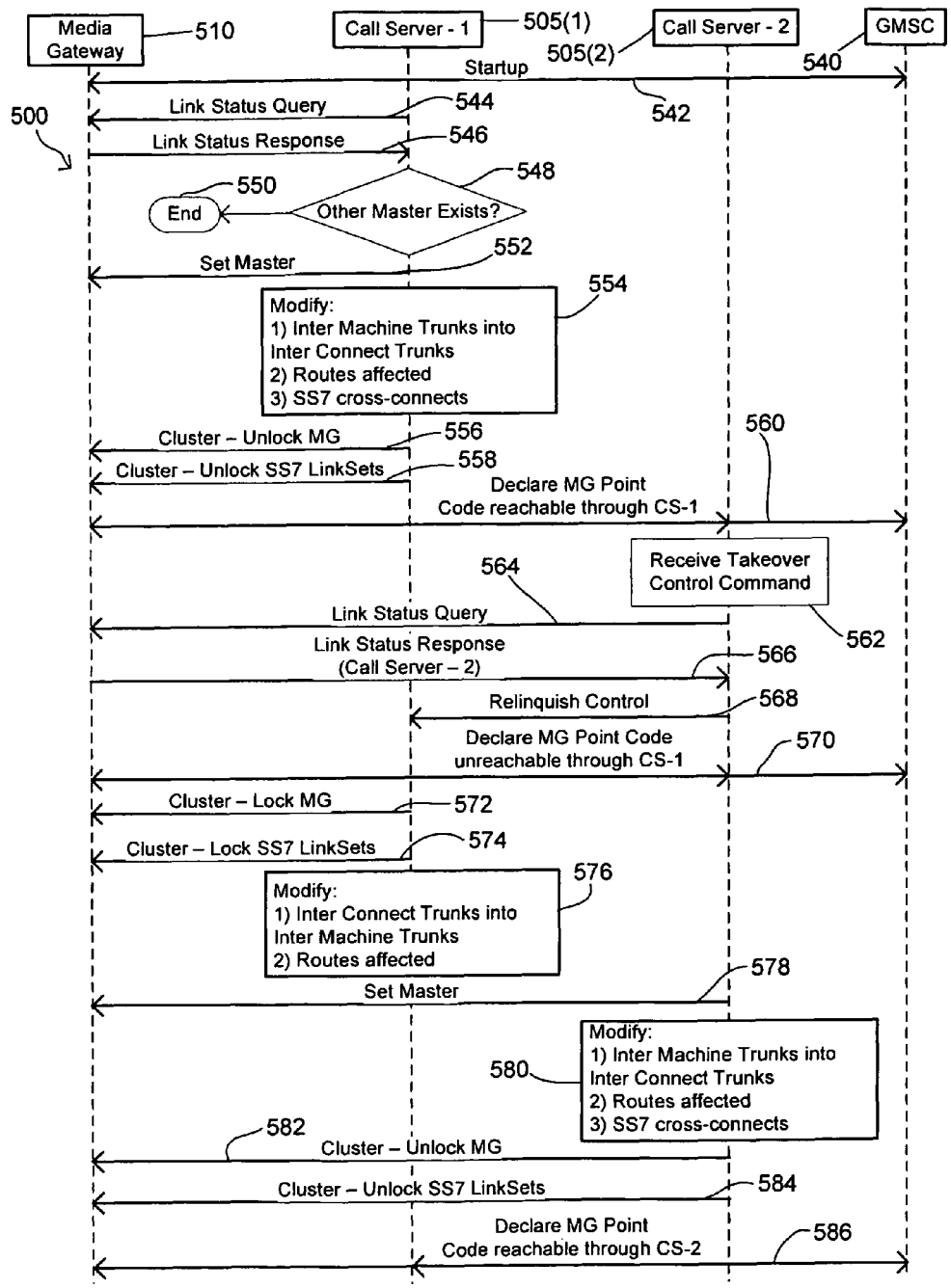
FIG. 5 is a signaling and process diagram for a distributed MSC cluster.

FIG. 5 is a signaling and process diagram for a distributed MSC architecture that includes a media gateway 510, a primary callserver1 505(1), a secondary callserver2 505(2), and a gateway MSC 540. The signaling and process diagram outlines an illustrative process 500 for taking over control of a media gateway 510.

Upon system startup 542 the call server1 505(1) sends a linkStatusQuery 544 to the media gateway 510 to enquire as to the media gateway's link status with its master call server. The media gateway 510 returns a linkStatusResponse 546. If it is determined that another master call server (e.g., call server2 505(2)) exists 548 and the media gateway's 510 master call server is in control of the media gateway 510, the process 500 is aborted 550. If another master call server does not exist (as determined at 548) or the media gateway's 510 master call server is not in control of the media gateway 510, the callserver1 505(1) issues a setMaster command 552 to the media gateway 510. After the setMaster command 552 has been sent, the call server1 505(1) changes 554 the inter machine trunks to the media gateway 510 into inter connect trunks as necessary, modifies 554 defined routes affected by the addition of the media gateway 510 to the distributed MSC controlled by the call server 505(1) (e.g., such that the call server 505(1) is aware of which media gateway 510 corresponds to the most effective routing to an external switch), and modifies 554 the SS7 cross-connects through the media gateway 510 to change routings of signaling data received from base station controllers so that they are sent to the call server 505(1). The call server1 505(1) sends a set of commands to the media gateway 510. The commands include unlocking 556 the media gateway 510 and unlocking 558 the SS7 linksets associated with the media gateway 510. The call server1 505(1) issues a broadcast message 560 that declares the media gateway 510 point code as being reachable through call server1 505(1).

In the event that the call server2 505(2) receives a takeover control command 562 (e.g., from the system operator), the callserver2 505(2) issues a linkStatusQuery to the media gateway 510. The media gateway 510 returns a linkStatus response 566 to call server2 505(2) indicating that the master server of the media gateway 510 is currently call server1 505(1). The call server2 505(2) sends a RelinquishControl 568 message to call server1 505(1) instructing call server1 505(1) to relinquish control of the media gateway 510. In response, call server1 505(1) sends out a broadcast message 570 indicating that the point code for media gateway 510 is unreachable through call server1 505(1). Call server1 505(1) sends a set of commands to the media gateway 510. The commands include locking 572 the media gateway 510 and locking 574 the SS7 linksets. After the media gateway 510 and the SS7 linksets have been locked 572 and 574, the call server1 505(1) modifies 576 the inter connect trunks to the media gateway 510 into inter machine trunks and modifies 576 the defined routes affected by the locking of the media gateway 510. The callserver2 505(2) sends a setMaster 578 command to the media gateway 510, which indicates to the media gateway 510 that the call server2 505(2) is the new master. After the setMaster command 578 has been sent, the call server2 505(2) modifies 580 the inter machine trunks to the media gateway 510 into inter connect trunks as necessary, modifies 580 the defined routes affected by the addition of the media gateway 510 to the distributed MSC controlled by the call server2 505(2), and modifies 580 the SS7 cross-connects through the media gateway 510 to change routings of signaling messages received from base station controllers from the call server1 505(1) to the call server2 505(2). The call server2 505(2) sends a set of commands to the media gateway 510. The commands include unlocking 582 the media gateway 510 and unlocking 586 the SS7 linksets. The call server2 505(2) issues a broadcast message 588 that declares the media gateway point 510 as being reachable through call server2 505(2).

Figure 6:
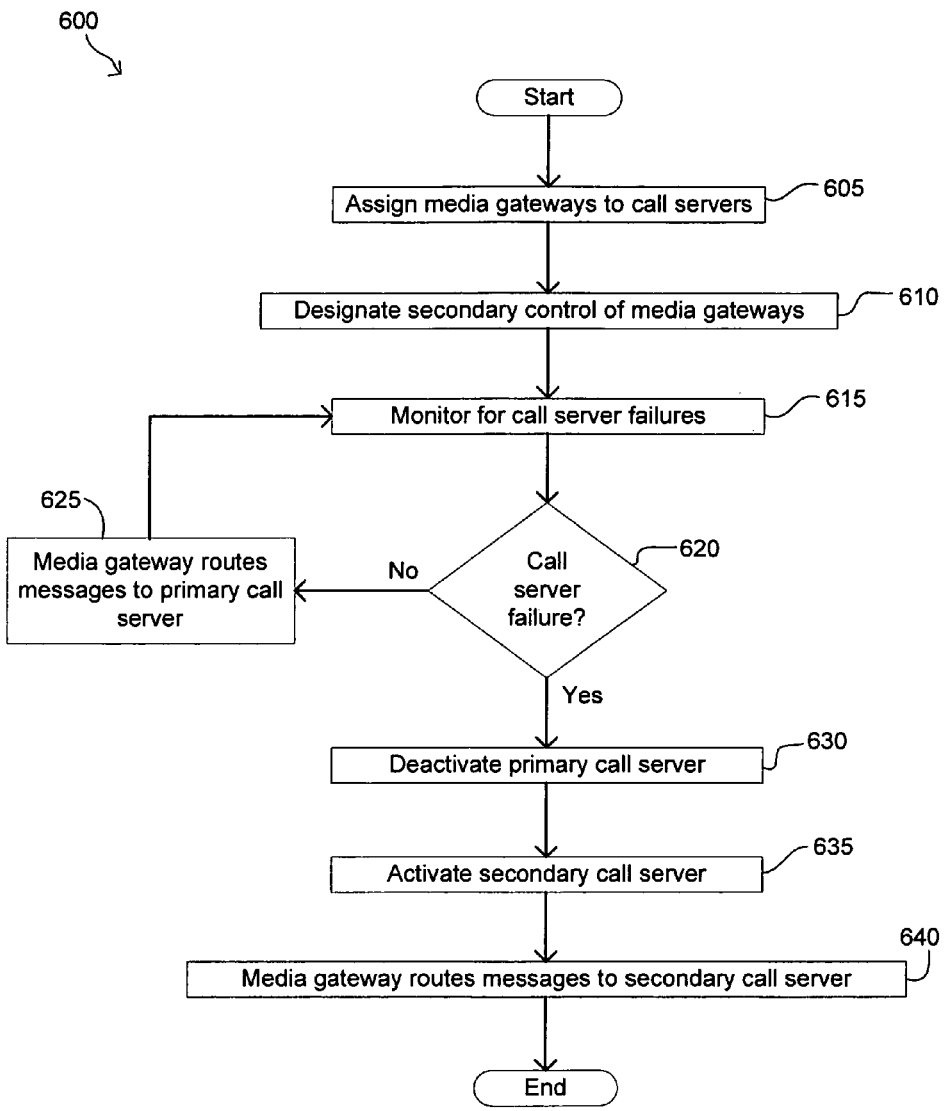
FIG. 6 is a flowchart showing method for providing call server failure protection to a distributed MSC (DMSC) cluster.

FIG. 6 shows a method 600 for providing call server failure protection to a distributed MSC (DMSC) cluster (such as that shown in FIG. 1). As previously mentioned, the distributed MSC 100 cluster may include a plurality (for example, three) of call servers 105(1), 105(2), and 105(3) and a plurality of media gateways 110(1-1), 110(1-2), 110(2-1), 110(2-2), 110(3-1) and 110(3-2) internal to the distributed MSC cluster 100. Each of the media gateways 110(1-1), 110(1-2), 110(2-1), 110(2-2), 110(3-1) and 110(3-2) may be assigned 605 to one or more of the call servers 105. However, each of the media gateways 110 generally has only one call server 105 that has primary control, which involves receiving and sending of messages for setting up and controlling of voice trunks 120 to and from the media gateways 110.

Additionally, a call server 105 within the distributed MSC cluster 100 is designated 610 as having secondary control of one of the media gateways 110 from the set of media gateways 110(1-1, 1-2), 110(2-1, 2-2), and 110(3-1, 3-2) previously assigned to a primary call server 105(1), 105(2), or 105(3). Another call server 105 within the distributed MSC cluster 100 is designated as having secondary control of the other media gateway 110 from the set of media gateways 110 previously assigned to a primary call server 105.

The call servers 105 and the media gateways 110 exchange messages over the control links 125 and 135 to monitor 615 for a failure 620 of the other call servers 105. The secondary control of the media gateways 110 by the call servers 105 remains dormant while the primary control of the media gateways 110 is active. A failure of the primary control of the media gateways 110 (as determined at 620) results in a deactivation 630 of the primary control. The secondary control of the media gateways 110 by the call servers 105 may be activated 635 in response to such a failure of the primary control of the media gateways 110 due to, for example, the failure of a call server 105 or the failure of a primary control link 125. In the event of a call server 105 failure 620, the media gateway routes messages (e.g., signaling messages received from a base station controller) to the secondary call server 105.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instruction and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of implementations have been described. Nevertheless, it will be understood that various modifications may be made. Accordingly, other implementations are within the scope of the following claims.

What is claimed is:

1. A memory storing instructions for causing data processing apparatus to:
associate a different set of media gateways with each of at least three call servers prior to a failure of one or more of the call servers, each call server having primary control of a unique set of media gateways including a first call server having primary control of a first set of media gateways, the first set of media gateways including a first media gateway and a second media gateway;
associate secondary control of the first media gateway with a second one of the call servers;
activate secondary control of the first media gateway in response to deactivation of primary control of the first media gateway;
associate secondary control of the second media gateway with a third one of the call servers;

activate secondary control of the second media gateway in response to deactivation of primary control of the second media gateway; and stores instructions for causing a call server to route traffic addressed to a destination point code through a third media gateway under primary control of the second call server if secondary control of the first media gateway is deactivated and through the first media gateway if secondary control of the first media gateway is activated.

2. The memory of claim 1 wherein the memory stores instructions for causing data processing apparatus to send a command to deactivate primary control of at least one of the first media gateway or the second media gateway.

3. The memory of claim 1 wherein the memory stores instructions for causing data processing apparatus to mesh secondary control of media gateways.

4. The memory of claim 1 wherein the memory stores instructions for causing data processing apparatus to instruct the first media gateway to switch routing of messages from the first call server to the second call server in response to deactivation of primary control of the first media gateway.

5. The memory of claim 4 wherein the memory stores instructions for causing data processing apparatus to:

disable signaling and traffic through the first media gateway in response to an instruction to deactivate primary control of the first media gateway; and enable signaling and traffic through the first media gateway after activating secondary control of the second media gateway.

6. The memory of claim 1 wherein the memory stores instructions for causing data processing apparatus to:

associate unique primary point codes with each of the first call server and the second call server, the primary point codes for use in call processing; and associate a shared secondary point code with the first call server and the second call server, the shared secondary point code for use by nodes that communicate through the first media gateway with one of the first call server or the second call server depending on whether primary control or secondary control is activated for the first media gateway.

7. The memory of claim 6 wherein the memory stores instructions for causing the first call server to broadcast a message indicating that the shared secondary point code is unreachable through the first call server in response to receiving an instruction to relinquish control of the first media gateway.

* * * * *